July 9, 1968  G. F. FRIAUF ET AL  3,391,577
GAS SAMPLING APPARATUS
Filed Sept. 13, 1965
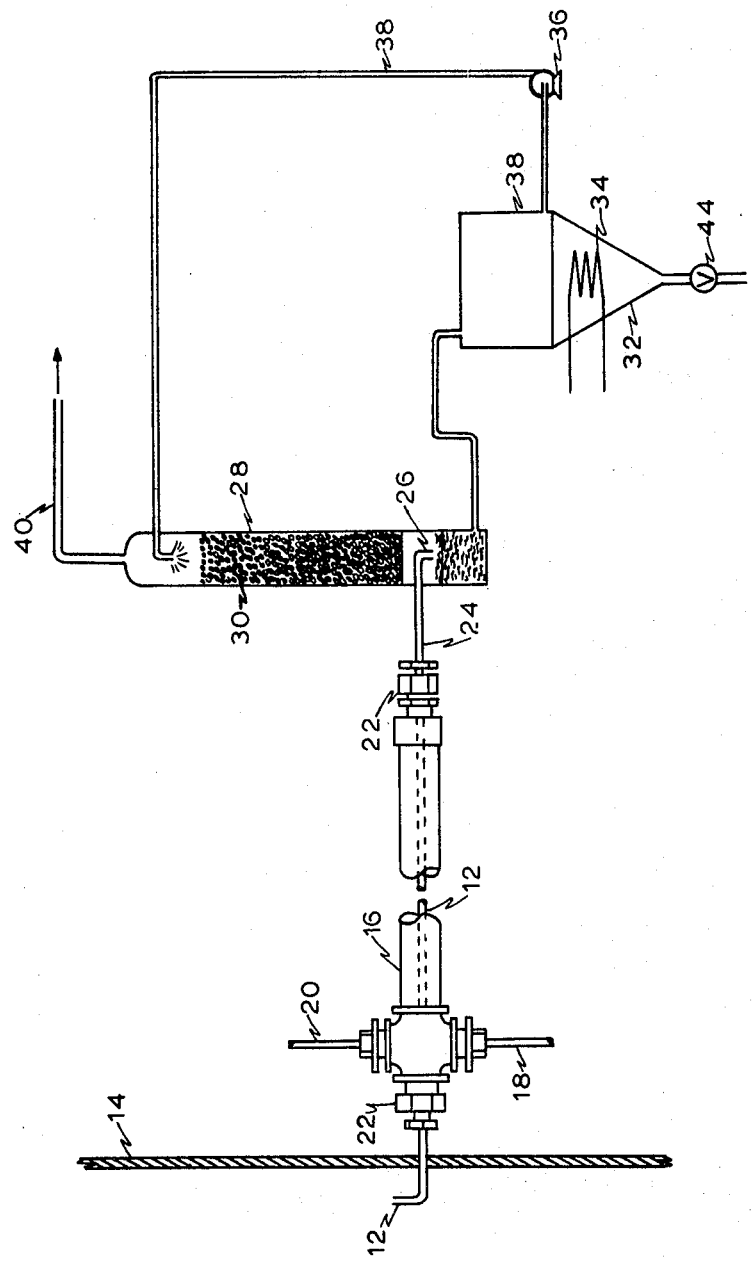

United States Patent Office 3,391,577
Patented July 9, 1968

3,391,577
GAS SAMPLING APPARATUS
George F. Friauf, John H. Horn, and Charles H. Cox, Pampa, Tex., assignors to Cabot Corporation, Boston, Mass., a corporation of Delaware
Filed Sept. 13, 1965, Ser. No. 486,608
7 Claims. (Cl. 73—421.5)

ABSTRACT OF THE DISCLOSURE

An apparatus for sampling gases containing particulate contaminants and condensible components. The apparatus includes a tube for obtaining the gas from a source and a cooling jacket surrounding the tube. The tube introduces the sampled gas into the bottom of a gas liquid contact column which gas is subsequently withdrawn from the top. The column contains a bed of glass beads and is provided with means for introducing a contact liquid such as mineral oil into the top and withdrawing it from the bottom. A recycle system for the contact liquid includes a separator for removing particles in the liquid, means for heating the liquid and a pump for returning the liquid to the top of the column. Because of the heating of the liquid, any sample gases condensed therein are liberated when the liquid is sprayed into the top of the column again.

---

The sampling of gases in industrial operations is becoming increasingly important. This is so not only because of the increasing prominence of combustion-type chemical operations, but also because of the increasing vigilance of governmental agencies with respect to atmosphere-contaning materials contained in gaseous effluents.

The usefulness of an analysis of any gas, no matter how carefully carried out, is largely dependent upon the care and planning with which the gas sample, on which an analysis is to be based, is taken. Care must be taken to assure that the sample is meaningful in terms of the system being tested. This is especially true when the analysis is made not merely for the purposes of identifying components of a gas sample, but is made to ascertain the concentration of various gases in a gaseous mixture. The sampling becomes highly critical when the make-up of the gas mixture is being used as a criterion in judging the acceptability of prevailing conditions in a combustion-type chemical reaction.

Among the more serious problems encountered in obtaining representative samples of industrial gas effluents are (1) the presence of solid matter in the effluent and (2) the presence of easily condensible gases in the effluent. Solid matter which usually is small particulate material such as smoke, dust or lint tends to plug sampling devices. Easily condensible gases, for example steam, oftentimes condense on the sampling surface or somewhere in the sampling system and thereby avoid transmission to the actual testing device being utilized.

Therefore it is an object of the present invention to provide sampling apparatus for gaseous material.

It is a further object of the invention to provide sampling apparatus whereby condensible gases may be analyzed with precision.

It is still another object of the invention to provide apparatus whereby particulate matter in the gaseous effluent being sampled cannot interfere with effective sampling.

It is another object of the invention to provide a process whereby industrial gases may be sampled accurately even though a quantity of solid matter and condensible gases are present therein.

Other objects of the invention are in part obvious or in part set forth hereinafter.

Applicants have largely achieved the aforementioned objects by providing gas sampling apparatus wherein the sample of effluent gas is conveyed to a column wherein gas-liquid contact takes place and wherein the gaseous sample is washed free of any solid contaminants. Simultaneously, any condensible materials are condensed and transported from the gas inlet side of the column and recycled, in an inert carrier liquid, to the gas outlet side of the column. During this recycling, the condensed material is heated and thereby conditioned for reevaporation upon rejoinder with the main body of gases at the gas outlet side of the gas-liquid contact column.

FIGURE 1 is a schematic diagram of the apparatus of the invention.

Referring now to FIGURE 1, it is seen that a quartz sampling tube 12 protrudes into stack 14. The tube has a water jacket 16 into which water is introduced through inlet tube 18 and removed through outlet tube 20. Stuffing boxes 22 provide adequate seals at either end of water jacket 16. After being partially cooled in that section of tube 12 passing through jacket 16, the gas sample is conveyed through tube 24 to the sample inlet 26. At this point the sample breaks into two components. The first component is the main gaseous component carrying a quantity of solid matter entrained therewith. This flows upward through column 28 filled with glass beads 30. The solid matter tends to attach to the glass beads. This attachment is promoted by the wetting of the beads with a liquid recycling through the sample testing apparatus. A much smaller component comprising liquids condensed out of the gas during its passage through water jacket 16 and tube 24 is collected in an inert carrier liquid, in this instance mineral oil, at the bottom of column 28. This condensed material is carried in the mineral oil into reservoir 32 wherein it is heated in the inert medium by heating element 34 immersed therein. Oil pump 36 continuously conveys the heated oil through pipe 38 back to the top of column 28 at such a temperature that the material originally condensed from the gases prior to entry into column 28 escapes from the liquid carrier and rejoins the main body of the gas for exit through conduit 40 and transport to a gas testing apparatus.

In practice, presence in the sample being tested of all condensible components in the sample actually taken is assured by maintaining the temperature of the carrier liquid well above the boiling temperature of liquids condensed out of the gas sample and by maintaining the top of column 28 and the conduit to the point of measurement of the condensible component well above the dew point of said condensible component. When aqueous liquids are condensed, mineral oils of a boiling point of about 500 to 750° F. are advantageously used. Heating the oil has the additional benefit of reducing solubility of any sample gas in the oil.

A drain 44 at the bottom of oil reservoir 32 provides means for removing dirty oil and sediment which will accumulate from time to time in the carrier liquid recycle loop.

The type of packing media used in column 28 must be chosen with special reference to the type of particulate matter to be removed from the gaseous effluent being treated. Glass beads utilized in the above illustrative example are particularly useful for removing very small particle-type materials, such as soot.

The recycling inert wash media is chosen with a number of properties in mind. These include a boiling temperature high enough to be easily separable from vapors of condensible components of the gas being sampled, low mutual solubility with the gas being sampled and easy wetting of the surface of whatever packing is chosen in the liquid-gas contacting column. A wetted packing column is most effective for removing particulate matter.

While emphasis in the above description of the invention has been given to utilizing the novel apparatus for analysis wherein retention of the condensible components is desirable, it will also be recognized by those skilled in the art that the apparatus may be used for removing condensible components which are not required for analysis and which may complicate analytical procedures or interpretation of results. To avoid recycling such condensibles into the gas stream being analyzed, one may cool rather than heat the recycling wash media.

In this application and accompanying drawings, we have described and shown a preferred embodiment of our invention and have suggested various alternatives and modifications thereof, but it is to be understood that these are not intended to be exhaustive and that other changes and modifications can be made within the scope of the invention. These suggestions herein are selected and included for purposes of illustration in order that others skilled in the art will more fully understand the invention and the principles thereof and will be enabled to modify it and embody it in a variety of forms, each as may be best suited to the condition of a particular case.

What is claimed is:

1. Apparatus for continuously sampling gas comprising a tube for receiving a sample gas stream; a gas-liquid contact column having a gas inlet in the lower portion and a gas outlet in the upper portion; means to cool and transport said gas sample stream from said receiving tube to said inlet; a quantity of carrier liquid; a carrier liquid recycle loop adapted to withdraw liquid from the lower portion of said column and recycle said withdrawn liquid into the upper portion thereof and means for heating liquid in said recycle loop.

2. Apparatus as in claim 1 wherein said column is a packed column.

3. Apparatus as in claim 1 wherein said column is packed with glass beads.

4. Apparatus as in claim 1 wherein said recycle loop comprises a reservoir section.

5. A process for continuously sampling gas comprising withdrawing a gas sample stream from a gas containing system to be tested; conveying said gas sample stream into the lower portion of a liquid-gas contact column; providing a carrier liquid in said column and continuously recycling said liquid from the lower portion of said column into the upper portion thereof, thereby achieving removal of particulate contaminants in said column by the liquid gas contact and collection of condensed components from said gas sample stream into the carrier liquid; continuously heating the carrier liquid being recycled into the upper portion of said column to a temperature sufficient to expel the collected condensed components contained therein and discharging the resulting particle-free recombined gas stream sample from the upper portion of said column.

6. The apparatus of claim 4 wherein said reservoir section comprises said means for heating liquids in said recycle loop.

7. A process as in claim 5 wherein said particulate matter is the sooty product of a combustion process, liquid gas contact is carried out in a packed column, and said carrier liquid is a mineral oil boiling above 500° F.

References Cited

UNITED STATES PATENTS

| | | | |
|---|---|---|---|
| 1,476,292 | 12/1923 | Galusha | 55—233 |
| 2,356,845 | 8/1944 | Hines | 73—421.5 |
| 2,489,893 | 11/1949 | Johnson | 73—421.5 |
| 2,691,423 | 10/1954 | McIlvaine | 55—233 |

DAVID SCHONBERG, *Primary Examiner.*

S. C. SWISHER, *Assistant Examiner.*